United States Patent
Zhang et al.

(10) Patent No.: US 10,592,027 B2
(45) Date of Patent: Mar. 17, 2020

(54) STATE-BASED TOUCH THRESHOLD

(71) Applicant: Apple Inc., Cupertino, CA (US)

(72) Inventors: Sai Zhang, Santa Clara, CA (US); Branislav Jovanovic, San Francisco, CA (US); Sean E. O'Connor, Palo Alto, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 15/701,069

(22) Filed: Sep. 11, 2017

(65) Prior Publication Data

US 2019/0079613 A1 Mar. 14, 2019

(51) Int. Cl.
| | |
|---|---|
| *G06F 3/041* | (2006.01) |
| *G06F 3/044* | (2006.01) |
| *G06F 1/3215* | (2019.01) |
| *G06F 1/3234* | (2019.01) |
| *G02F 1/1333* | (2006.01) |

(Continued)

(52) U.S. Cl.
CPC .......... *G06F 3/0412* (2013.01); *G02F 1/1343* (2013.01); *G02F 1/13338* (2013.01); *G06F 1/3215* (2013.01); *G06F 3/044* (2013.01); *G06F 3/0418* (2013.01); *G06F 3/04166* (2019.05); *H04M 1/0266* (2013.01); *G06F 1/3262* (2013.01); *G06F 2203/04104* (2013.01); *H04M 2250/22* (2013.01)

(58) Field of Classification Search
CPC ...... G06F 3/0412; G06F 3/044; G06F 1/3262; G06F 2203/04104; G06F 3/0418; G02F 1/1343; G02F 1/13338
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |

(Continued)

FOREIGN PATENT DOCUMENTS

| | | | |
|---|---|---|---|
| JP | 2000-163031 | A | 6/2000 |
| JP | 2002-342033 | A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Aneeta Yodichkas
(74) *Attorney, Agent, or Firm* — Kubota & Basol LLP

(57) ABSTRACT

A touch sensitivity of a touch-sensitive surface can be adjusted based on a state of a device including the touch-sensitive surface. The state of the device can be a first state or a second state. In the first state, for example, the touch sensing system of the device can be programmed to recognize and process a wide range of touch signals including relatively weak touch signals, which may correspond to water, liquid or other unintentional touches. In the second state, for example, the touch detection threshold can be adjusted to better reject water or unintended touches. In some examples, a ratio of measurements captured using the different types of scans of a selected touch node can be used to determine the state of the device.

25 Claims, 11 Drawing Sheets

(51) Int. Cl.
*G02F 1/1343* (2006.01)
*H04M 1/02* (2006.01)

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,599,169 B2 | 12/2013 | Nascimento | |
| 9,141,208 B2 | 9/2015 | Park et al. | |
| 10,152,162 B1 | 12/2018 | Bokma et al. | |
| 2006/0197753 A1 | 9/2006 | Hotelling | |
| 2011/0061949 A1 | 3/2011 | Krah et al. | |
| 2012/0098766 A1* | 4/2012 | Dippel | G06F 3/0416 345/173 |
| 2012/0293447 A1 | 11/2012 | Heng et al. | |
| 2013/0173211 A1 | 7/2013 | Hoch et al. | |
| 2014/0118011 A1 | 5/2014 | Burger et al. | |
| 2014/0184561 A1 | 7/2014 | Kim | |
| 2014/0306924 A1 | 10/2014 | Lin et al. | |
| 2014/0306926 A1 | 10/2014 | Lee | |
| 2015/0277609 A1* | 10/2015 | Jung | G06F 3/0416 345/173 |
| 2015/0309604 A1* | 10/2015 | Lai | G06F 3/044 345/173 |
| 2016/0117043 A1 | 4/2016 | Kim | |
| 2017/0090511 A1* | 3/2017 | Rudolph | G06F 1/163 |
| 2019/0095036 A1 | 3/2019 | Bokma | |

OTHER PUBLICATIONS

Non-Final Office Action dated Aug. 2, 2017, for U.S. Appl. No. 14/859,021, filed Sep. 18, 2015, nine pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

STATE-BASED TOUCH THRESHOLD

FIELD OF THE DISCLOSURE

This relates generally to touch input processing for touch-sensitive devices, and more particularly, to detecting a state of a touch-sensitive device and setting a touch threshold based on the detected state.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

Touch sensor panels can include an array of touch sensors capable of detecting touches (the touching by an object such as a finger upon a touch-sensitive surface). Some touch sensor panels are able to detect multiple touches (e.g., the touching of multiple fingers upon a touch-sensitive surface at distinct locations at or about the same time) and near touches (e.g., fingers within the near-field detection capabilities of their touch sensors), and identify and track their locations.

Not all touches detected on a touch sensor panel, however, may be intended user input. For example, water on the surface of the touch sensor panel can be detected as a touch. In particular, water on a touch-sensitive surface in contact with a metal housing of the device or a finger can be grounded and appear as a touch by a finger. Additionally, unintentional touches can be detected as the result of accident proximity or light contact with body parts (e.g., contact on a wearable device when crossing arms, contact with the side of a hip for a device in a user's pocket, etc.). As a result, water (or other liquids) or other unintentional touches can result in unintended behavior by the device. Triggering unintended behavior of the device can negatively affect user experience.

SUMMARY OF THE DISCLOSURE

This relates to systems and methods of adjusting touch sensitivity of a touch-sensitive surface based on a state of a device including the touch-sensitive surface. In some examples, the state of the device can be a first state in which a grounding condition of the device and/or object contacting the touch screen may be unknown or inferred to be poorly-grounded or a second state in which the grounding condition can be inferred to be well-grounded. For example, when a user contacts a conductive housing of a device and uses a body part or user-potential object, the common grounding between the device and touch object can corresponded to a well-grounded condition. In contrast, when the user is not in contact with the conductive housing of the device, the grounding condition for the device and touch object can correspond to a poorly-grounded condition. The intensity of touch signals measured at a touch node can be greater (e.g., by one or two orders of magnitude) for a well-grounded condition than a poorly-grounded condition. When the grounding condition of the system is unknown or known to be a poorly-grounded condition, the touch sensing system of the device can be programmed to recognize and process a wide range of touch signals including relatively weak touch signals, which may correspond to water, liquid or other unintentional touches. For example, a touch detection threshold can be set to a level in which sensitivity to intended touches can be ensured. However, such a threshold level can be low enough to also register and process water, liquid or other unintended touches. In some examples, the touch detection threshold can be adjusted to better reject water or unintended touches when a device state indicates a well-grounded grounding condition for the touch system. In some examples, the touch detection threshold can be a signal density threshold. In some examples, the state of the device can be determined by the touch sensing system by capturing touch images using different types of scans. In some examples, a ratio of measurements using the different types of scans of a selected touch node can be used to determine the state of the device.

DETAILED DESCRIPTION

Figure 1A:
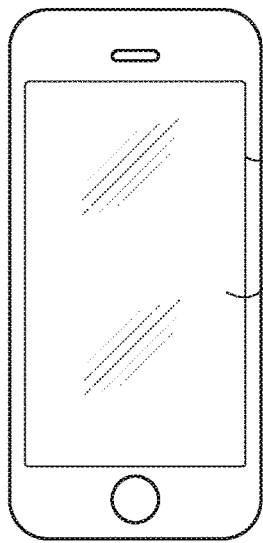
FIGS. 1A-1E illustrate exemplary systems with touch screens that can perform input processing according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods of adjusting a touch sensitivity of a touch-sensitive surface (e.g., touch screen, touch sensor panel) based on a state of a device including the touch-sensitive surface. In some examples, the state of the device can be a first state in which a grounding condition of the device and/or object contacting the touch screen may be unknown or inferred to be poorly-grounded or a second state in which the grounding condition can be inferred to be well-grounded. For example, when a user contacts a conductive housing (chassis) of a device and uses a body part (e.g., fingers, palms, wrist, etc.) or user-potential object (e.g., stylus or other input device with a conductive housing in contact with the user), the common grounding between the device and touch object can corresponded to a well-grounded condition. In contrast, when the use is not in contact with the conductive housing of the device (e.g., device rests on a table or is isolated from a user's body by a non-conducting case), the grounding condition for the device and touch object can correspond to a poorly-grounded condition. The intensity of touch signals measured at a touch node can be greater (e.g., by one or two orders of magnitude) for a well-grounded condition than a poorly-grounded condition. When the grounding condition of the system is unknown or known to be a poorly-grounded condition, the touch sensing system of the device can be programmed to recognize and process a wide range of touch signals including relatively weak touch signals, which may correspond to water, liquid or other unintentional touches. For example, a touch detection threshold (i.e., one of one or more thresholds used for evaluating whether a touch signal or an input patch including multiple touch signals is sufficient to identify as a touch—or part of a touch—for additional touch processing) can be set to a level in which sensitivity to intended touches can be ensured. However, such a threshold level can be low enough to also register and process water, liquid or other unintended touches. In some examples, the touch detection threshold can be adjusted (e.g., raised) to better reject water or unintended touches when a device state indicates a well-grounded grounding condition for the touch system. In some examples, the touch detection threshold can be a signal density threshold. In some examples, the state of the device can be determined by the touch sensing system by capturing touch images using different types of scans (e.g., guarded and non-guarded). In some examples, a ratio of measurements using the different types of scans of a selected touch node can be used to determine the state of the device.

Figure 1B:
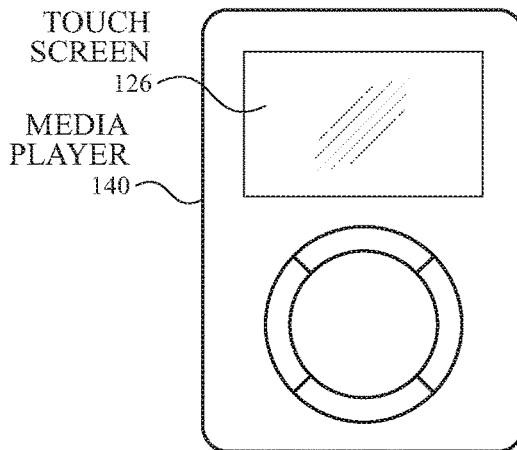
Figure 1C:
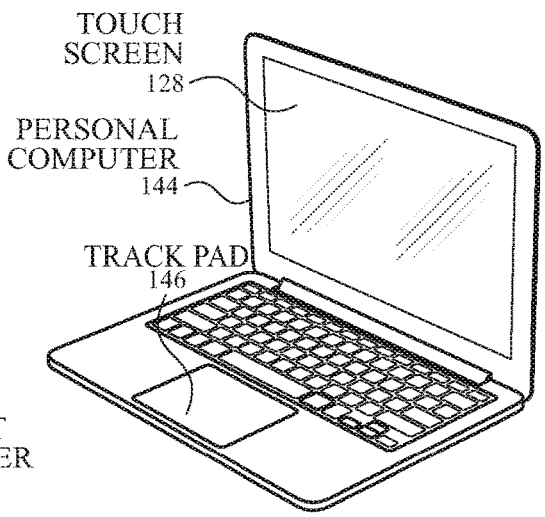
Figure 1D:
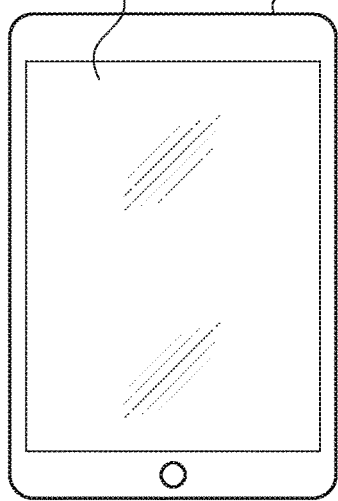
Figure 1E:
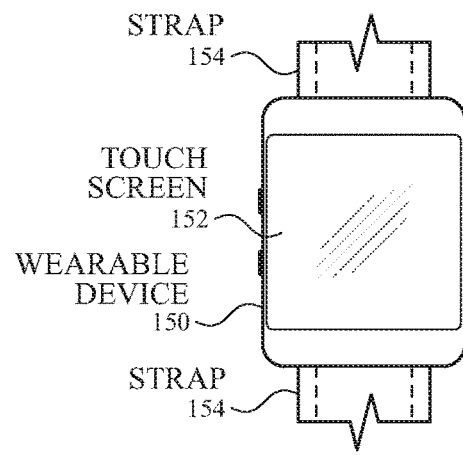

FIGS. 1A-1E illustrate exemplary systems with touch screens that can perform input processing according to examples of the disclosure. As described in more detail herein, the input processing can include determining a state (e.g., grounding state) of the device/system, and adjusting a device/system sensitivity (e.g., touch detection threshold) based on the state. FIG. 1A illustrates an exemplary mobile telephone 136 that includes a touch screen 124 and can perform input processing according to examples of the disclosure. FIG. 1B illustrates an example digital media player 140 that includes a touch screen 126 and can perform input processing according to examples of the disclosure. FIG. 1C illustrates an example personal computer 144 that includes a touch screen 128 and a track pad 146 and can perform input processing according to examples of the disclosure (on inputs detected from the touchscreen 128 or track pad 146). FIG. 1D illustrates an example tablet computing device 148 that includes a touch screen 130 and can perform input processing according to examples of the disclosure. FIG. 1E illustrates an example wearable device 150 (e.g., a watch) that includes a touch screen 152 and can perform input processing according to examples of the disclosure. Wearable device 150 can be coupled to a user via strap 154 or any other suitable fastener. It should be understood that the example devices illustrated in FIGS. 1A-1E are provided by way of example, and other types of devices can perform input processing according to examples of the disclosure. Additionally, although the devices illustrated in FIGS. 1A-1E include touch screens, in some examples, input processing according to examples of the disclosure can be performed for touch sensor panels without a display (e.g., track pad 146). In some examples, touch screens 124, 126, 128, 130 and 152 can be based on self-capacitance and/or mutual capacitance. In some examples, a touch screen can be multi-touch, single touch, projection scan, full-imaging multi-touch, capacitive touch, etc.

Figure 2:
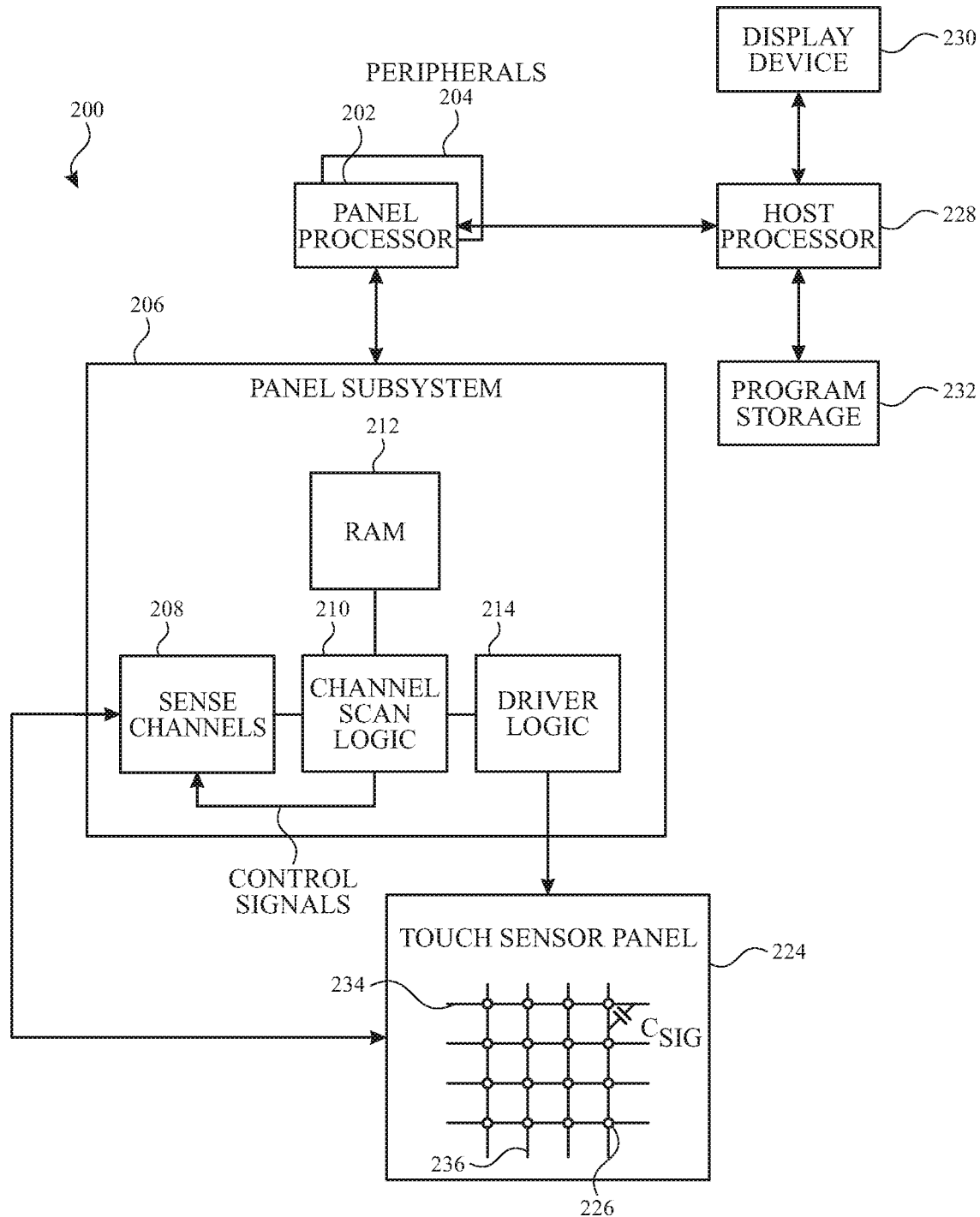
FIG. 2 illustrates an exemplary computing system including a capacitive touch sensor panel that can perform input processing according to examples of the disclosure.

FIG. 2 illustrates an exemplary computing system 200 including a capacitive touch sensor panel 224 that can perform input processing according to examples of the disclosure. Computing system 200 can be included in, for example, mobile telephone 136, digital media player 140, personal computer 144, tablet computing device 148, wearable device 150, or any mobile or non-mobile computing device that includes a touch sensor panel or touch screen. Computing system 200 can include a touch sensing system including one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208 (also referred to as sense circuitry). Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channels 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. Panel processor 202 can process the data received from scanning the touch sensor panel. For example, panel processor can process data from different types of touch scans (e.g., guarded and non-guarded) to determine a state of the device, and adjust a touch detection threshold based on the state of the device. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching the panel or proximate to, but not touching, the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. Each sense electrode of touch sensor panel 224 can be coupled to a sense channel 208 in panel subsystem 206. Touch sensor panel 224 can cover a portion or all of a surface of a device.

Figure 8A:
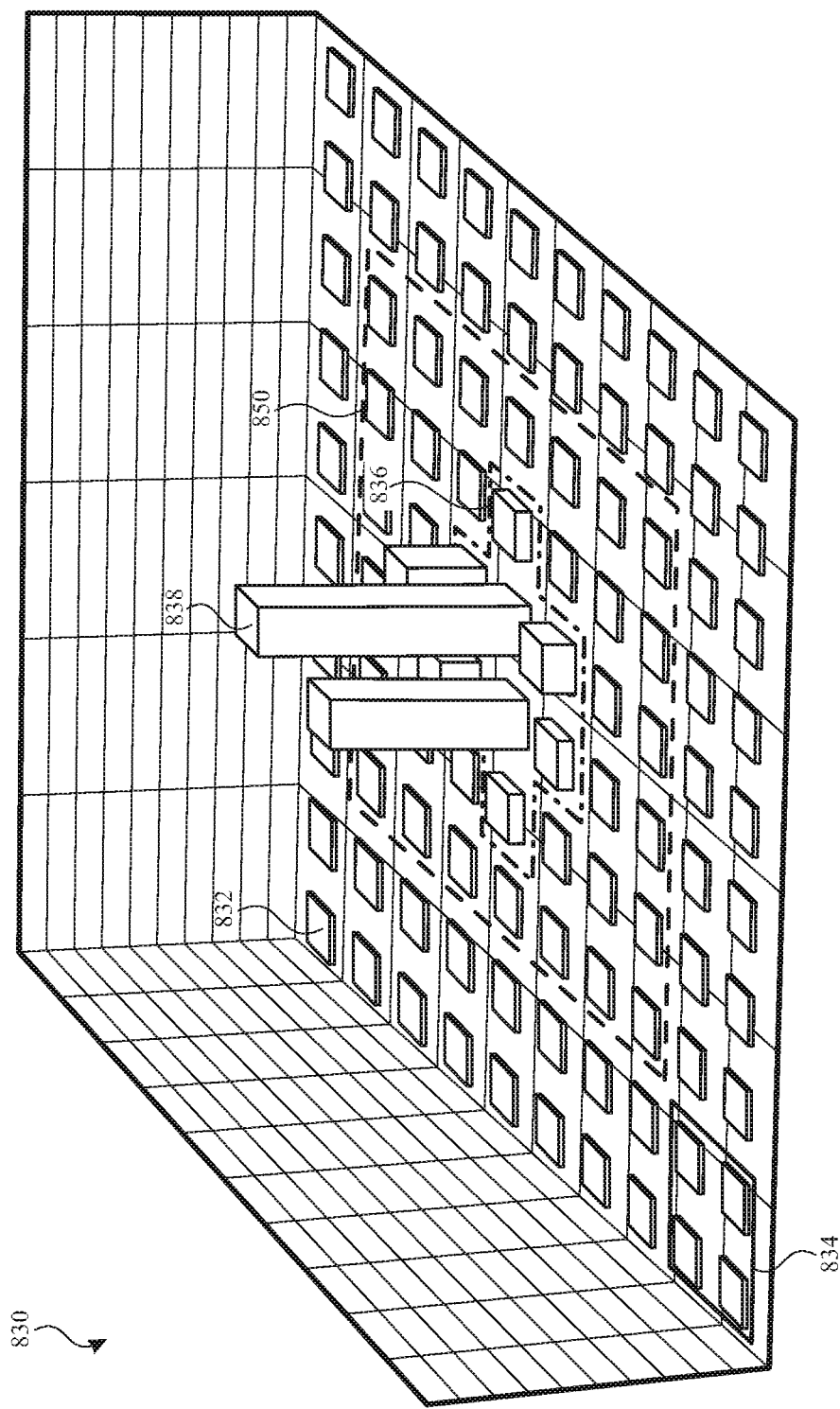
FIGS. 8A and 8B illustrate exemplary touch images for guarded and non-guarded scans according to examples of the disclosure.
Figure 8B:
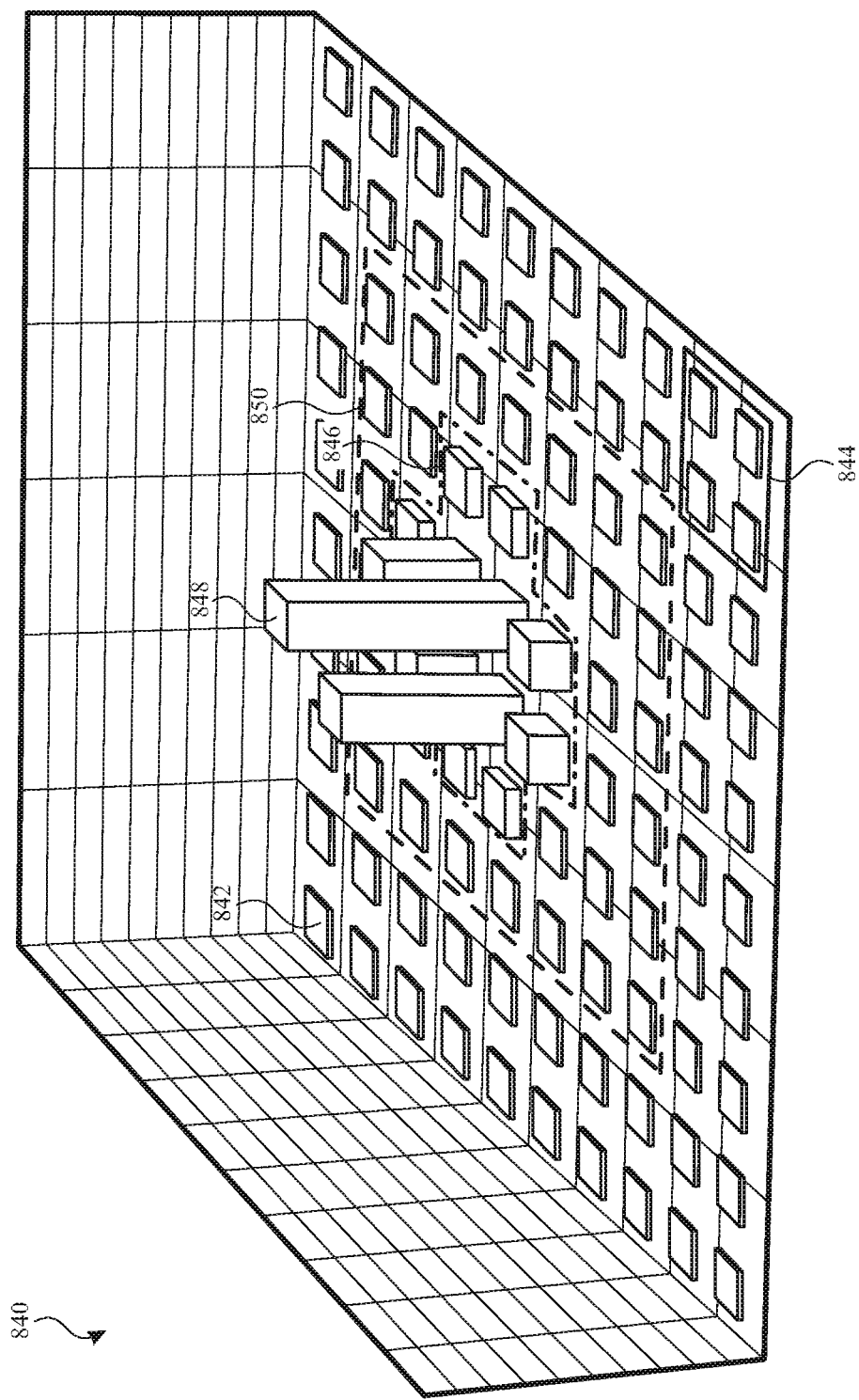
Figure 10:
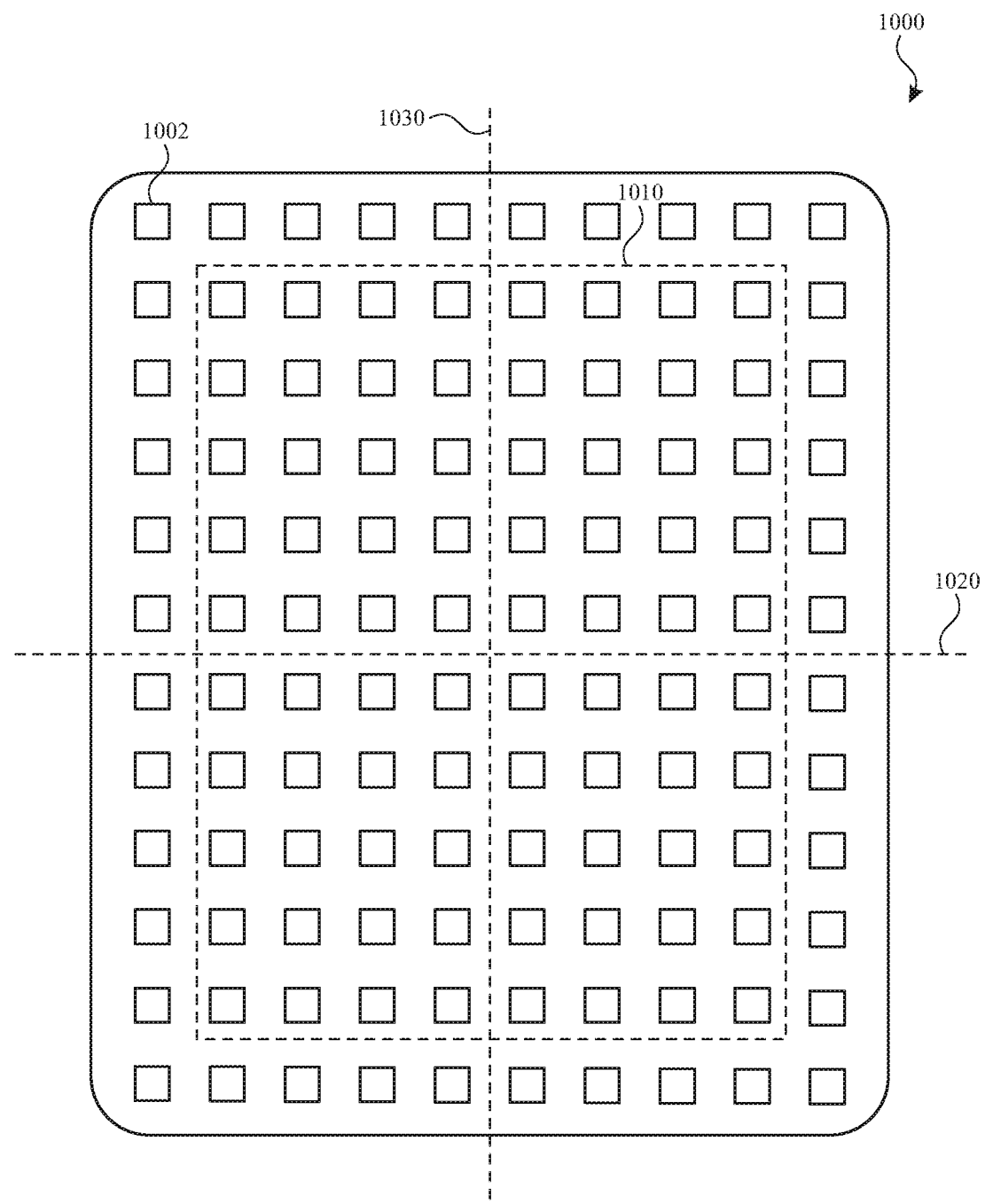
FIG. 10 illustrates an exemplary touch sensitive surface including an array of touch nodes according to examples of the disclosure.

In some self-capacitance sensing examples, touch sensor panel 224 can include a matrix of small plates of conductive material that can be referred to as a touch pixel, touch node, or a touch pixel electrode or touch node electrode (e.g., as illustrated in touch nodes 832, 842 and 1002 in FIGS. 8A-8B and 10). The touch nodes can be formed from a transparent conductive medium such as ITO or ATO, although other transparent and non-transparent materials such as copper can also be used. The touch nodes can be formed on a single side of a transparent substrate. In some examples, a touch screen can include a plurality of individual touch nodes, each touch node identifying or representing a unique location on the touch screen at which touch or proximity (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform (from the driver logic 214), and the self-capacitance to ground of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch sensor panel. Each touch node of touch sensor panel 224 can be coupled to a sense channel 208 in panel subsystem 206. Touch sensor panel 224 can cover a portion or all of a surface of a device. In some examples, the electrodes can be formed from rows and columns of conductive material, and changes in the self-capacitance to ground of the rows and columns can be detected. It should be understood that although touch sensor panel 224 can be implemented using various touch sensing technologies, the guarded and non-guarded scans described herein for use in determining state can be implemented for pixelated self-capacitance touch sensor panels (e.g., as illustrated in FIGS. 8A-8B and 10).

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when partially or entirely overlapping with the touch sensor panel, can form a touch screen.

In some examples, touch sensor panel 224 and display device 230 together can form an integrated touch screen in which touch nodes of the touch sensing system can be integrated into the display pixel stack-ups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as touch nodes of the touch sensing system. Specifically, each common electrode can operate as a common electrode of the display circuitry of the touch screen (e.g., during a display phase), and can also operate as a common electrode (i.e., a touch node) of the touch sensing system of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch nodes may be either a multi-function circuit element that can form part of the touch sensing system and can perform one or more other functions, such as forming part of the display circuitry, or may be a single-function circuit element that can operate as a touch node only. Similarly, each of the display circuit elements may be either a multi-function circuit element that can operate as display circuitry and perform one or more other functions, such as operating as a touch node, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

Note that one or more of the functions described herein, including the processing of inputs according to examples of the disclosure, can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
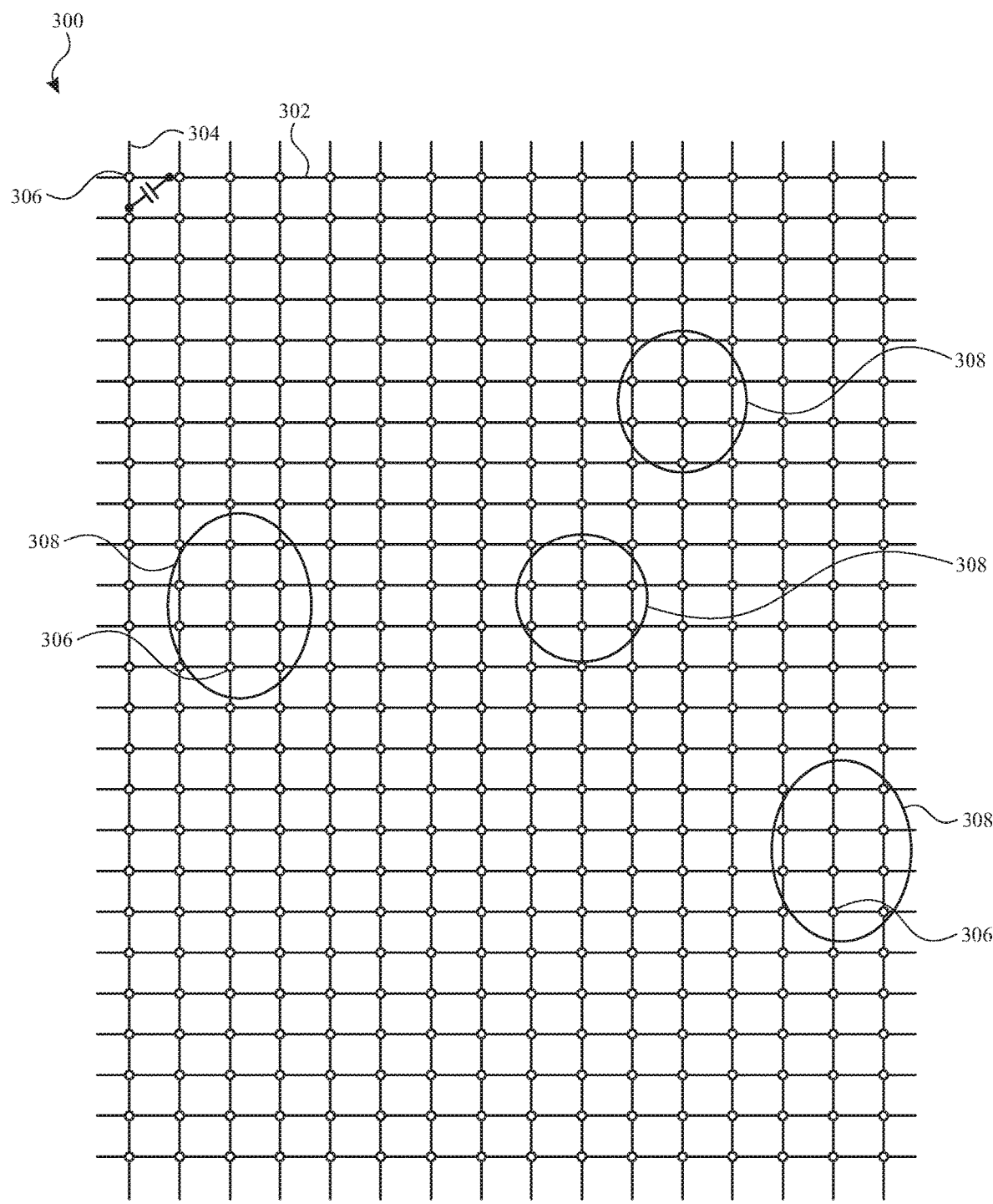
FIG. 3 illustrates an exemplary representation of an image of touch according to examples of the disclosure.

As discussed above, capacitive measurements (touch signals or data) at the touch nodes of touch sensor panel 224 can be viewed as an image of the touch (or touch image) when processed by panel processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible (e.g., the touch nodes of a pixelated self-capacitance touch sensor as illustrated in FIGS. 8A-8B).

Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. By processing the touch image, touch signals from proximate touch nodes 306 (e.g., those touch signals meeting a threshold signal level) can be grouped together to form input patches 308. Thus, the input patches 308 can be regions within the image of touch corresponding to touch nodes 306 having signal values produced by an object touching (or proximate to, but not touching, in some examples) the touch screen 300. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal (or maximum signal), minimum signal, position, shape, size and/or orientation. In some examples, each input patch can be represented by an ellipse defined by a centroid (location of touch), major and minor axis lengths and/or a major axis (and/or minor axis) orientation (or alternatively an x-axis radius and a y-axis radius). In some examples, the number of touch nodes, peak signal, total signal and/or signal density for each input patch can be computed. In some examples, the number of touch nodes, peak signal and/or peak signal density can be tracked for each path across multiple touch images.

For example, the number of touch nodes in a path can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \text{ in } P} [V^2_{[i][j]}] \tag{1}$$

where $Z_P$ can represent the total signal for an input patch, V can represent the signal value at a touch node and i, j can represent the row and column coordinate of each touch node. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,P} = \frac{Z_P}{\text{geometric mean radius of } P} \quad (2)$$

$$Z_{density,P} = \frac{Z_P}{\text{number of touch nodes forming } P} \quad (3)$$

A conventional touch sensing system may process and compute characteristics for all input patches identified in an acquired image. In other words, these conventional touch sensing systems may process patches corresponding to intentional, actual touches as well as input patches corresponding to unintended touches or liquids (e.g., water). In some examples, further processing can be used to identify and reject touches from water or unintended touches. However, processing all input patches this way can require significant processing resources. In some examples of the disclosure, rather than using further processing to reject or filter out water or unintended touches, the water or unintended touches can be rejected or filtered out by adjusting (e.g., increasing) the touch detection threshold for identifying an input patch as a potential touch patch. The adjustment of the touch detection threshold can be based on a state determination that can be based on information gathered by initial processing of touch images with relatively low-intensity processing before performing the relatively computation-intensive processing applied to likely touches. Efficiency can be improved by excluding input patches that are likely not intended touch input before applying computation-intensive touch processing algorithms when justified based on a determined state. As described herein, in some examples, the initial processing can include acquiring multiple touch images, selecting a touch node, computing a ratio of touch signals from the multiple touch images, determining a state based on the ratio and a ratio threshold, and adjusting the touch detection threshold based on the state. In subsequent processing, input patches identified as touches can be fully parametrized and processed to generate touch input for a computing system. Excluding input patches based on the initial processing without the subsequent further processing can reduce processing requirements of, and thereby reduce power consumption by, the touch sensing system. Additionally, eliminating likely non-touch input patches before processing can avoid false positives when the further processing algorithms fail to differentiate between intended and non-intended touches.

Figure 4:
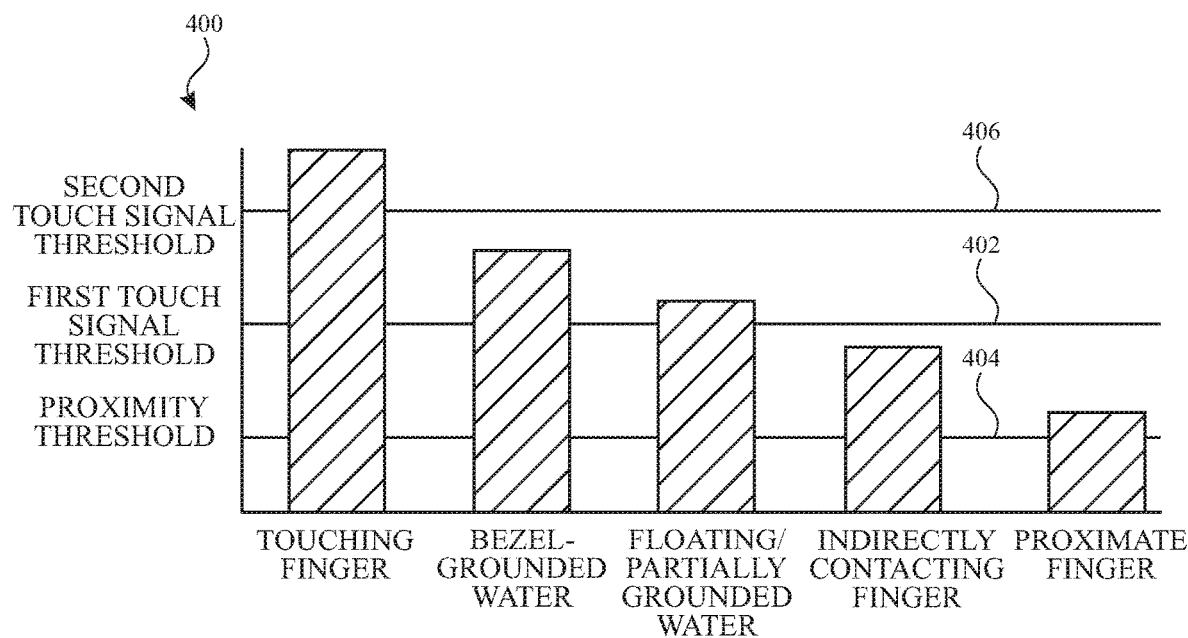
FIG. 4 illustrates an exemplary plot of touch signal thresholds corresponding to different objects proximate to or touching a touch-sensitive surface according to examples of the disclosure.

FIG. 4 illustrates an exemplary plot 400 of touch signal thresholds corresponding to different objects proximate to or touching a touch-sensitive surface according to examples of the disclosure. FIG. 4 illustrates example peak signals for an input patch (e.g., peak signal density) corresponding to a finger proximate to, but not in contact with, a touch-sensitive surface, a finger indirectly contacting the touch-sensitive surface (e.g., via a glove or bandage), a finger in contact with a touch-sensitive surface, a floating or partially grounded water drop (or other liquid), and a bezel-grounded water drop (or other liquid). It should be understood that these are representative peak signal measurements for input patches, and that a range of peak signal values are possible for these objects. For example, an indirectly contacting finger may have a peak signal larger than a floating water drop when the separation between the indirectly contacting finger and the touch-sensitive is within a threshold distance of the screen (e.g., <1 mm). Among the represented objects in FIG. 4, peak signal for an input patch can be greatest for a finger in contact with a touch-sensitive surface and least for a fingering proximate to, but not in contact with, the touch sensitive surface. Peak signal for an input patch corresponding to a bezel-grounded water drop can be less than for an input patch corresponding to a finger in contact with the touch-sensitive surface, but greater than for an input patch corresponding to a floating or partially grounded water drop. Peak signal for an input patch corresponding to a floating or partially-grounded water drop can be less than for an input patch corresponding to a bezel-grounded water drop, but greater than for an input patch corresponding to an indirectly contacting finger or a proximate, non-contacting finger.

In some touch sensing systems, a first touch signal threshold 402 (e.g., signal density) can be defined to differentiate between input patches corresponding to touches and non-touches. In some examples, this first touch signal threshold can be used to identify input patches in a touch image. For example, the peak signal corresponding to a finger in contact with a touch sensitive surface can meet the first touch signal threshold 402, but the peak signal corresponding to a proximate, non-contacting finger can fail to meet the first touch signal threshold 402. The peak signal corresponding to a water drop (grounded or floating), however, can also meet the first touch signal threshold. Additionally the peak signal corresponding to a large proximate, but not touching, object can meet the first signal threshold. Raising the threshold from the first touch signal threshold 402 to a second touch signal threshold 406 can better reject input patches corresponding to water or other unintended touches, but can cause the touch sensing system to miss actual finger touches (increasing false negatives). In some examples, as described in more detail below, in a first state (e.g., corresponding to an ungrounded state) the first touch signal threshold 402 can be used to identify input patches, and in a second state (e.g., corresponding to a grounded state) a second touch signal threshold 406, higher than the first touch signal threshold, can be used. Using the second touch signal threshold 406 can result in rejecting input patches corresponding to water (grounded and/or floating) or other unintentional touches. It should be understood that although the first and second states may be referred to as ungrounded state and grounded state, ungrounded state can refer to signal conditions indicative of a poorly-grounded condition or unknown grounding condition, and grounded state can refer to signal conditions indicative of a well-grounded condition.

In some touch sensing systems, a proximity threshold 404 can be defined to identify input patches corresponding to objects proximate to, but not in contact with, the touch sensitive surface. In some examples, these proximate, non-contacting patches can be used to wake up the device or otherwise prepare for touch input. Additionally, in some touch sensing systems, indirectly contacting fingers or objects can be detected using a dynamically adjustable touch signal threshold 402 or using other conditions as described in U.S. Pat. No. 9,690,417 to Ari Y. BENBASAT, the disclosure of which is herein incorporated by reference in its entirety for all intended purposes.

As described herein, in some examples, the touch signal threshold can be adjustable depending on a state (e.g., grounded state, ungrounded state). For example, the touch signal threshold may be set at a first value in a first state and set at a second value in a second state. For example, the first state can correspond to an ungrounded state (or a state in which the device may not be determined to be grounded with confidence) and the second state can correspond to grounded state. The touch signal threshold (e.g., signal density) can be lower in the first state than in the second state. A relatively low touch signal threshold can allow the touch-sensitive device to detect intended touches with a reduced touch signal levels that may occur under poor grounding conditions or due to light taps by the user. A relatively high touch signal threshold can better reject unintended touches when device grounding provides increased touch signal levels from actual touches.

Figure 5:
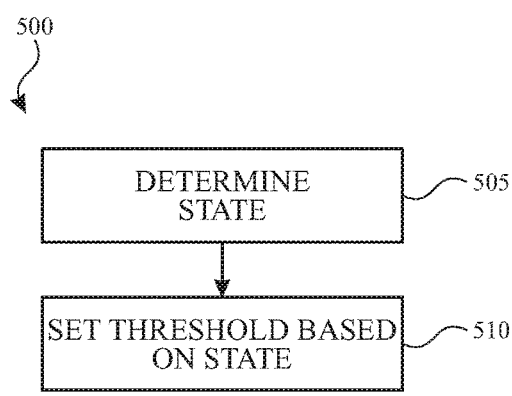
FIG. 5 illustrates an exemplary process for adjusting a touch signal threshold according to examples of the disclosure.

FIG. 5 illustrates an exemplary process 500 for adjusting a touch signal threshold according to examples of the disclosure. At 505, a state of a device (e.g., one of exemplary systems illustrated in FIGS. 1A-1E) can be determined (inferred). For example, the state can be determined to be a first state (e.g., corresponding to an ungrounded device) or a second state (e.g., corresponding to a grounded device). In some examples, as described herein, the state can be determined based on two touch images of the touch-sensitive surface. In some examples, the state can be determined based on detection of a user wearing a device (e.g., wearable device 150 in FIG. 1E) or otherwise in contact with a conductive housing of the device as described in U.S. patent application Ser. No. 14/859,021 filed Sep. 18, 2015 to Louis W. BOKMA et al., the disclosure of which is herein incorporated by reference in its entirety for all intended purposes. In some examples, the state can be determined based on a combination of touch images and detection of user contact with a conductive device housing. In some examples, that state can be determined based on touch images or detection of user contact with a conductive device housing depending on operating conditions. At 510, a sensitivity of the device can be adjusted based on the state of the device. For example, a touch signal threshold (e.g., a $Z_{density}$ threshold) can be adjusted to a first threshold level in a first state and to a second threshold level in a second state. The second threshold level can be higher than the first threshold level to improve rejection of unintended input in the second state. Although first and second threshold levels are described, it should be understood that additional threshold levels can be used (e.g., when using additional grounding states). Adjusting the device sensitivity based on state can improve touch performance to ensure detection of intended touches in the first state (e.g., ungrounded state) and to better reject unintended touches when operating in the second state (e.g., grounded state), as described in more detail herein.

Figure 6:
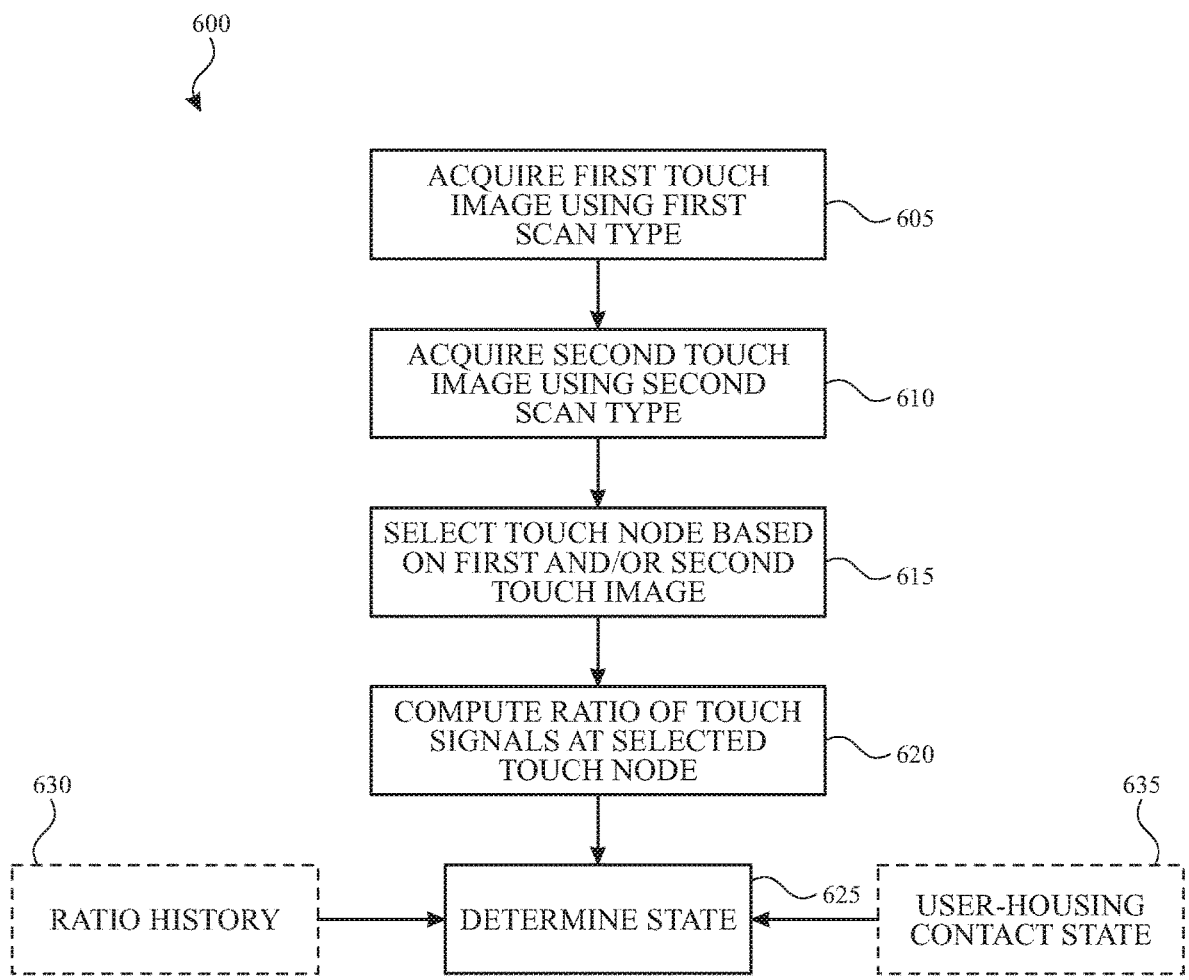
FIG. 6 illustrates an exemplary process for determining a state of a device according to examples of the disclosure.

FIG. 6 illustrates an exemplary process 600 for determining a state of a device according to examples of the disclosure. Process 600 can correspond to the state determination at 505. At 605, a first touch image of the touch nodes of a touch-sensitive device can be acquired, and at 610 a second touch image of the touch nodes of a touch-sensitive device can be acquired. The first touch image can be acquired using a first type of scan and the second touch image can be acquired using a second type of scan. For example, the first type of scan can be a non-guarded (also referred to as a partially-bootstrapped or non-bootstrapped scan) and the second type of scan can be a guarded scan (also referred to as a bootstrapped scan). The guarded scan can include driving non-sensed touch nodes in a given scan step of a multi-step scan with the same stimulation as sensed touch nodes or driving and sensing all touch nodes with the same stimulation step where the whole touch sensor panel can be scanned in one step. A non-guarded scan can include grounding one or more non-sensed touch nodes. For example, during each scan step some touch nodes can be stimulated and sensed and the remaining touch nodes can be grounded. At the completion of a scan (comprising multiple scan steps) each of the touch nodes of the touch-sensitive surface can be sensed. As a result of grounding some touch nodes, poorly-grounded or ungrounded fingers can be detected having increased signal levels compared with a guarded scan, and well-grounded fingers can be detected having decreased signal levels compared with a guarded scan.

At 615, one touch node can be selected based on the first and/or second touch images. The touch node can be selected based on one or more selection criteria. In some examples, the one or more selection criteria can include a signal-to-noise ratio (SNR). In some examples, the touch node can be selected having the maximum signal intensity in the first touch image (and improved SNR due to larger signal) acquired from the non-guarded scan. In some examples, the touch node can be selected having the maximum signal intensity in the second touch image acquired from the guarded scan. In some examples, the touch node can be selected from touch nodes more than a threshold distance from a conductive housing of the device. For example, touch nodes near the conductive housing can be relatively noisy due to grounding via the conductive housing (e.g., metallic bezel). For example, a proximate but not contacting finger (e.g., within 5 mm) of touch node near the bezel of a device may be difficult to distinguish from a poorly grounded finger in contact with a touch node distant from the bezel. At 620, a ratio of the signal intensity corresponding to the non-guarded scan to the signal intensity corresponding to the guarded scan can be computed for the selected touch node. At 625, the state can be determined based on the ratio of touch signals corresponding to the selected touch node, as described in more detail below.

In some examples, process 600 can be performed continuously (e.g., once per frame). In some examples, to save power, process 600 can be performed periodically (e.g., every 3 frames, once a minute). In some examples, process 600 can be performed when triggering conditions are satisfied. For example, in some examples, process 600 can occur while contact between a wearable device housing and a user is no longer detected, and can be disabled while contact between the wearable device housing and a user is detected. In some examples, process 600 can be disabled in a low-power state.

In some examples, the state can be determined each time a ratio is computed at 620, using the most current ratio computed for a selected touch node. For example, when the current ratio computed at 620 meets a ratio threshold for the selected touch node (e.g., less than a ratio threshold), the state can be determined to be the second state at 625. When the current ratio computed at 620 fails to meets the ratio threshold for the selected touch node (e.g., greater than or equal to the ratio threshold), the state can be determined to be the first state at 625.

In some examples, the determined state can be further based on a history of recent ratios (630). Using a history of ratios can provide a level of hysteresis or smoothing to prevent high frequency transitioning between the first and second states. For example, ratios measured from multiple iterations of 605, 610, 615 and 620 of process 600 can be computed and each of the multiple ratios can be compared with a respective ratio threshold corresponding to the respective selected touch node. When a threshold number of the measured ratios within a window including the current ratio meet their respective ratio thresholds, the second state can be determined at 625. When fewer than the threshold number of measured ratios within the window meet their respective ratio thresholds, the first state can be determined at 625. Thus, determining the second state (in which an increased signal threshold can be used) can be triggered when detecting the second state with increased confidence. The size of the window can be selected according to the desired confidence level. In some examples, the window can include information about 5-20 ratio comparisons. In some examples, the window can include information about fewer or more ratio comparisons. It should be understood that in some examples, each ratio in the history of ratios can correspond to the same selected touch node, but that in other examples, the history of ratios can include ratios (or information inferred about the state from ratios) calculated from different selected touch nodes (e.g., during different iterations). Additionally, it should be understood that in some examples, the current ratio can be added to the window and used to determine the state for the next frame rather than for the same frame in which it is computed.

In some examples, the determined state can be further based on whether contact is detected between a user and a conductive housing of the device (635). For example, user-housing contact state can be used to confirm (verify) the state otherwise indicated by the ratio or history of ratios described above. For example, when user contact with the conductive device housing is not detected or unknown (which can correspond to no confidence or a low confidence of grounding), the state can be determined at 625 to be the first state despite the ratio or history of ratios indicating the second state (grounding state). When the user contact with the conductive device housing is detected (which can correspond to high confidence of grounding) and the ratio or history of ratios indicate the second state, the second state can be determined at 625. When the ratio or the history of ratios indicate the first state, the first state can be determined at 625 irrespective of the user-housing contact state. In some examples, confidence measures can be attributed to a ratio-based state determination and to a user-housing contact based state determination, and the combination of the two metrics can be used to determine the state as the first or second state. In some examples, the user-housing contact based state determination can be used to verify the ratio-based state determination as the second state, but the user-housing contact based state determination need not be used verify the ratio-based state determination when no user-housing contact is detected. For example, a wearable device may detect user-housing contact using light emitters and detectors, and this user-housing contact state can verify the grounding condition of the device determined using ratios. However, when the wearable device detects no user-housing contact (off-wrist), the second state can still be determined using a ratio of history of ratios alone (e.g., where user-housing contact may come from contact with a bezel of the device or where the user-housing contact based state determination is in error). In such a case, the improved unintended touch rejection provided by a higher touch signal threshold can be employed when warranted by the grounding state of the device that may not be detected by the user-housing contact sensor(s).

Figure 7:
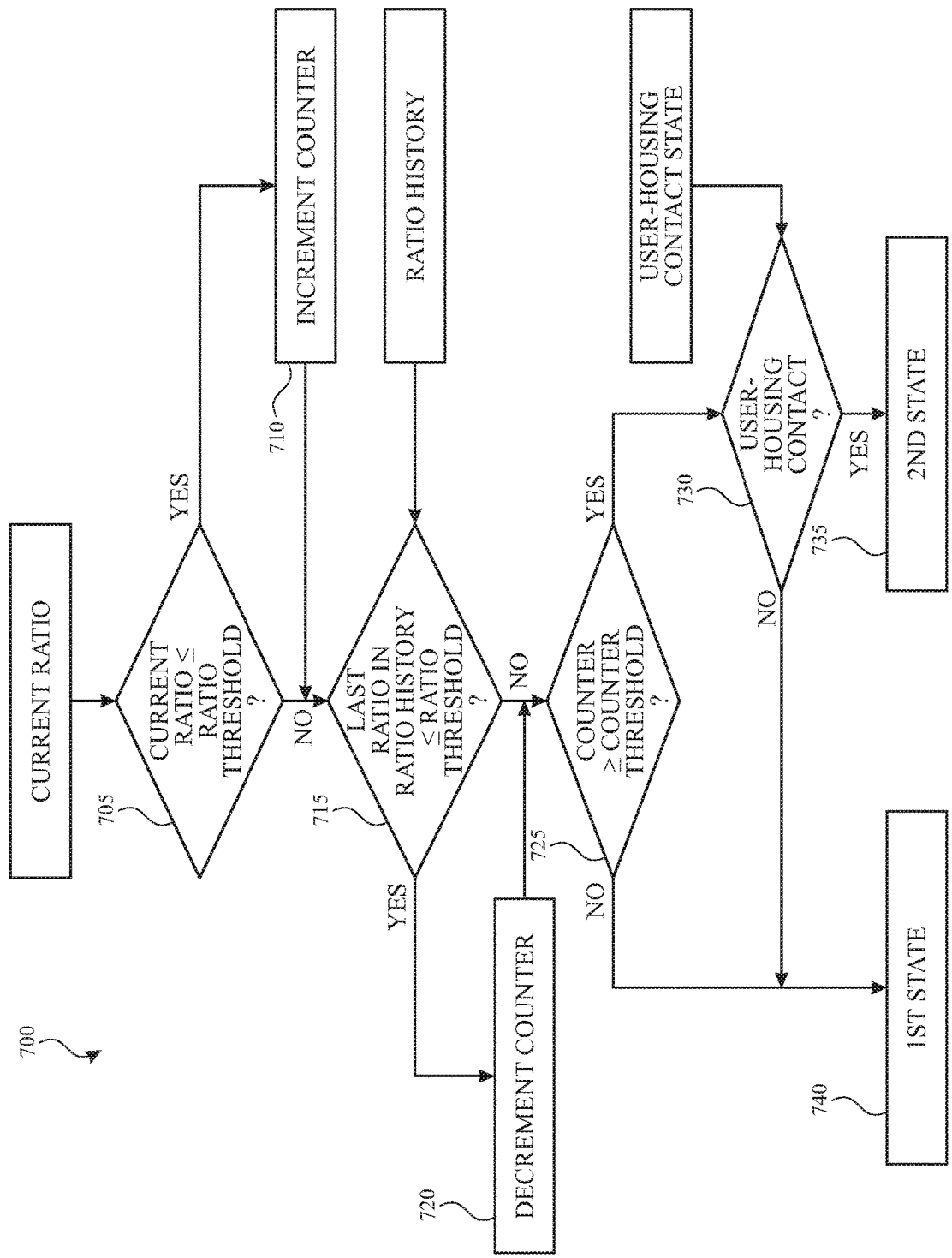
FIG. 7 illustrates an exemplary process for determining a state of a device according to examples of the disclosure.

FIG. 7 illustrates an exemplary process 700 for determining a state of a device according to examples of the disclosure. Process 700 can correspond to the state determination at 625 based on inputs including a current ratio, a history of ratios and a user-housing contact state (e.g., from one or more sensors mounted on or in a device housing). At 705, the current ratio for a selected touch node can be compared with a ratio threshold corresponding to the selected touch node. When the current ratio (e.g., computed at 620) meets the ratio threshold for the selected touch node, a counter can be incremented at 710. The counter can track the number of instances in the window in which one or more ratios meet their respective ratio threshold. When the current ratio (e.g., computed at 620) fails to meets the ratio threshold for the selected touch node, the counter can remain unchanged. The oldest ratio in the window can be discarded as the current ratio is added to the window, and its impact on the counter can be accounted for. The oldest (last) ratio in the window can be compared with its respective ratio threshold at 715. When the oldest ratio in the window meets the respective ratio threshold for its respective selected touch node, the counter can be decremented at 720. When oldest ratio in the window fails to meets the ratio threshold for its respective selected touch node, the counter can remain unchanged. It should be understood that the history of ratios can include the result of the comparison rather than the ratio and respective ratio threshold to avoid repeating the comparison to decrement (or not decrement) the counter at 720. Instead of a comparison of the ratio and ratio threshold, the result of the previously performed comparison can be used to decrement the counter (e.g., when it met the respective ratio threshold) or not decrement the counter (when it failed to meet the respective ratio threshold). At 725, the counter can be compared to a counter threshold, which can correspond to determining whether the threshold number of ratios in the window meet their respective ratio thresholds. When the threshold number of ratios in the window fail to meet their respective ratio thresholds, the first state can be determined at 740. When the threshold number of ratios in the window meet their respective ratio thresholds (corresponding to a ratio-based determination of the second state), the state can be verified using the user-housing contact state at 730. When the user-housing contact state indicates contact between the user and the device housing, the second state can be determined at 735. When the user-housing contact state indicates no contact between the user and the device housing, the first state can be determined at 740.

It should be understood that although process 700 includes both a history of ratios and a user-housing contact state verification, the history of ratios and/or the user-housing contact state verification can be omitted in some examples. For example, when both the history of ratios and the user-housing contact state verification are omitted, process 700 can skip from 705 or 710 to 725 and from 725 to 735 (bypassing 730) or 740. When the history of ratios is used without the user-housing contact state verification, process 700 can proceed to from 725 to 735 (bypassing 730) or 740. The touch signal threshold (e.g., $Z_{density}$ threshold) can be set at 510 based on the determined state.

As discussed above at 605 and 610, first and second touch images can be acquired using guarded and non-guarded scans, for example. FIGS. 8A and 8B illustrate exemplary touch images for guarded and non-guarded scans according to examples of the disclosure. Plot 830 in FIG. 8A illustrates an array of touch nodes 832 (e.g., corresponding to self-capacitance touch node electrodes) in the x-y plane and the z-dimension can represent the touch signal measured at the touch nodes. During the non-guarded scan, a touch signal can be measured for respective touch nodes by stimulating and sensing the respective touch nodes and grounding one or more proximate touch nodes. In some examples, the non-guarded touch scan can have N steps where N can represent the number of touch nodes (e.g., N=100 for the 10×10 array in FIG. 8A), and during each step a respective touch node can be stimulated and sensed while the remaining touch nodes can be grounded. In some examples, fewer than N steps can be used and multiple touch nodes can be stimulated and sensed simultaneous while other touch nodes are grounded. For example, the touch nodes can be divided into groups of four touch nodes. During each scan step, for a group 834 of four touch nodes, one touch node can be stimulated and sensed (D/S characteristic), one or more of the remaining three touch nodes can be grounded (G characteristic), and none or one or more of the remaining three touch nodes can be stimulated but not sensed (D characteristic). During three additional scan steps, the arrangement of touch nodes between D/S and G and/or D characteristics can be adjusted so that each of the touch nodes in group 834 can be sensed. The same process can be repeated (e.g., in parallel) for the remaining groups of four touch nodes. In some examples, the touch node with a D/S characteristic can be in the same relative position in each group during each scan step and the remaining touch nodes can have a G characteristic, such that each sensed touch node can be surrounded by grounded touch nodes (e.g., adjacent touch nodes are not stimulated and sensed in the same scan step). As illustrated in plot 830, the exemplary non-guarded scan can detect touch signals of zero (i.e., no change in self-capacitance after baselining) at most of the touch nodes, but non-zero touch signals in a region 836 corresponding to an object in proximity to or in contact with the touch sensitive surface, for example.

Plot 840 in FIG. 8B illustrates an array of touch nodes 842 (e.g., corresponding to self-capacitance touch node electrodes) in the x-y plane and the z-dimension can represent the touch signal measured at the touch nodes. During the guarded scan, a touch signal can be measured for respective touch nodes by stimulating and sensing the respective touch nodes and stimulating (but not necessarily sensing) proximate touch nodes. In some examples, the guarded touch scan can have a single step in which each touch node can be stimulated and sensed (e.g., all touch nodes having a D/S characteristic). In some examples, N scan steps (corresponding to N touch nodes) can be used, and during each step a respective touch node can be stimulated and sensed, while the touch nodes in proximity to the respective touch node can be stimulated but not sensed. In some examples, between 1 and N steps can be used. For example, during each scan step one touch node in a group 844 of four touch nodes can be stimulated and sensed (D/S characteristic) and the remaining touch nodes can be stimulated, but not sensed (D characteristic). During three additional scan steps, the arrangement of touch nodes between D/S and D characteristics can be adjusted so that each of the touch nodes in group 844 can be sensed. The same process can be repeated (e.g., in parallel) for the remaining groups of four touch nodes. In some examples, the touch node with a D/S characteristic can be in the same relative position in each group during each scan step, such that each sensed touch node can be surrounded by touch nodes with a D characteristic. As illustrated in plot 840, the exemplary non-guarded scan can detect touch signals of zero (i.e., no change in self-capacitance after baselining) at most of the touch nodes, but non-zero touch signals in a region 846 corresponding to an object in proximity to or in contact with the touch sensitive surface, for example.

As described herein, one of the touch nodes can be selected and a ratio between the touch signals corresponding to the selected touch node can be computed. In some examples, the selected touch node can be the touch node corresponding to the highest signal 848 (maximum intensity) in the touch image corresponding to the guarded scan (e.g., shown in plot 840). In some examples, the selected touch node can be the touch node corresponding to the highest signal 838 in the touch image corresponding to the non-guarded scan (e.g., shown in plot 830). In some examples, the selected touch node can be limited to more than a threshold distance from a conductive housing (e.g., non-edge touch nodes). For example, region 850 can be defined for the device such that electrodes within a threshold distance can be excluded from the selection. The exclusion of touch nodes proximate to the housing of the device (edges of the array of touch nodes) can reduce the impact of noise due to proximate finger grounding to the housing of the device. Although region 850 can be illustrated to exclude two touch nodes around the border of the array of touch nodes, in some examples, a larger or smaller number of touch nodes can be excluded from selection. Additionally, in some examples, the number of touch nodes excluded can non-uniform. For example, three electrodes from the edges could be excluded from selection within a threshold distance of a corner and one or two electrodes from the edges could be excluded as along edges between the corners (outside the threshold distance from the corners). Generally, region 850 can be drawn based on empirical study of potential interference from bezel grounding, for example.

Figure 8C:
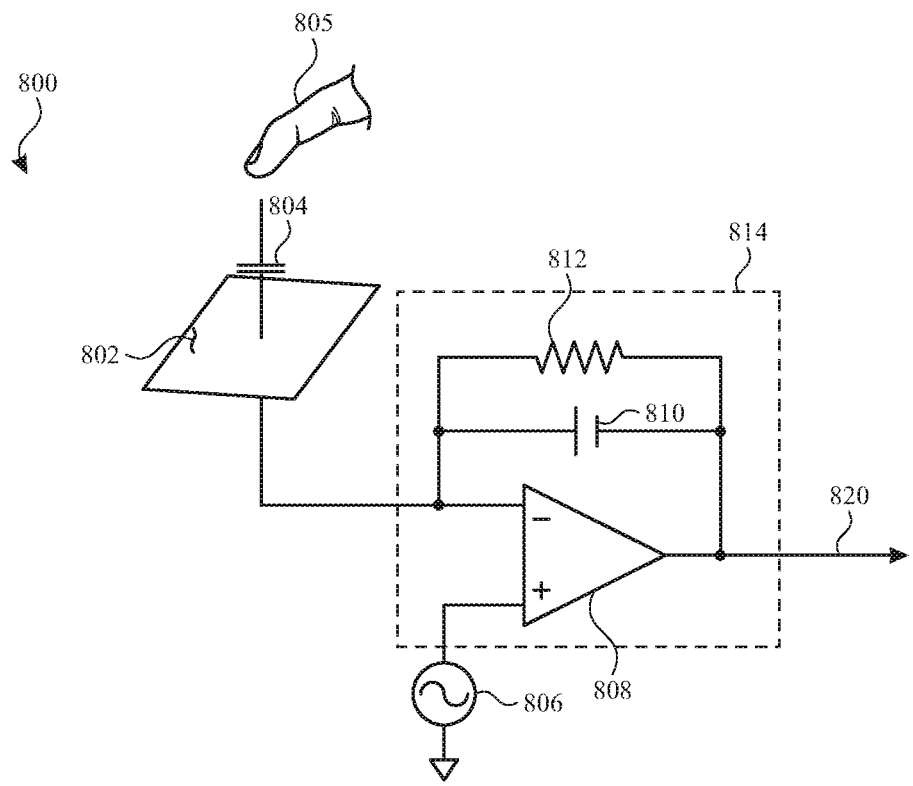
FIG. 8C illustrates an exemplary touch sensor circuit corresponding to a self-capacitance touch node electrode and sensing circuit according to examples of the disclosure.

As described above, touch nodes 832 and 842 can, for example, have a D/S characteristic, a D characteristic or a G characteristic depending on the scan or scan step. These characteristics can refer to coupling between a touch node and a ground or a touch sensor circuit. FIG. 8C illustrates an exemplary touch sensor circuit 800 corresponding to a self-capacitance touch node electrode 802 and sensing circuit 814 according to examples of the disclosure. Sensing circuit 814 can correspond to sense channels 208. Touch node electrode 802 can correspond to a self-capacitance touch node electrode. Touch node electrode 802 can have an inherent self-capacitance to ground associated with it, and also an additional self-capacitance to ground that is formed when an object, such as finger 805, is in proximity to or touching the electrode. The total self-capacitance to ground of touch node electrode 802 can be illustrated as capacitance 804. Touch node electrode 802 can be coupled to sensing circuit 814. Sensing circuit 814 can include an operational amplifier 808, feedback resistor 812 and feedback capacitor 810, although other configurations can be employed. For example, feedback resistor 812 can be replaced by a switched capacitor resistor in order to minimize a parasitic capacitance effect that can be caused by a variable feedback resistor. Touch node electrode 802 can be coupled to the inverting input (−) of operational amplifier 808 to sense the touch node. An AC voltage source 806 (Vac) can be coupled to the non-inverting input (+) of operational amplifier 808 to drive the touch node. Touch sensor circuit 800 can be configured to stimulate and then sense changes in the total self-capacitance 804 of the touch node electrode 802 induced by a finger or object either touching or in proximity to the touch sensor panel in the configuration illustrated in FIG. 8C (D/S characteristic). Output 820 (e.g., a touch signal) can be used by a processor to determine the presence of a proximity or touch event, or the output can be inputted into a discrete logic network to determine the presence of a proximity or touch event. A touch node electrode 802 can be configured to be stimulated but not sensed (D characteristic) by coupling touch node electrode 802 to AC voltage source

806 without coupling touch node electrode 802 to sensing circuit 814. A touch node electrode 802 can be configured to be grounded (G characteristic) by coupling touch node electrode 802 to a ground potential (e.g., without coupling touch node electrode 802 to sensing circuit 814). It should be understood that touch sensor circuit 800 and sensing circuit 814 are exemplary of a self-capacitance based touch sensor circuit, but other self-capacitance sensing circuits can be used (e.g., switched capacitor circuit).

Figure 9:
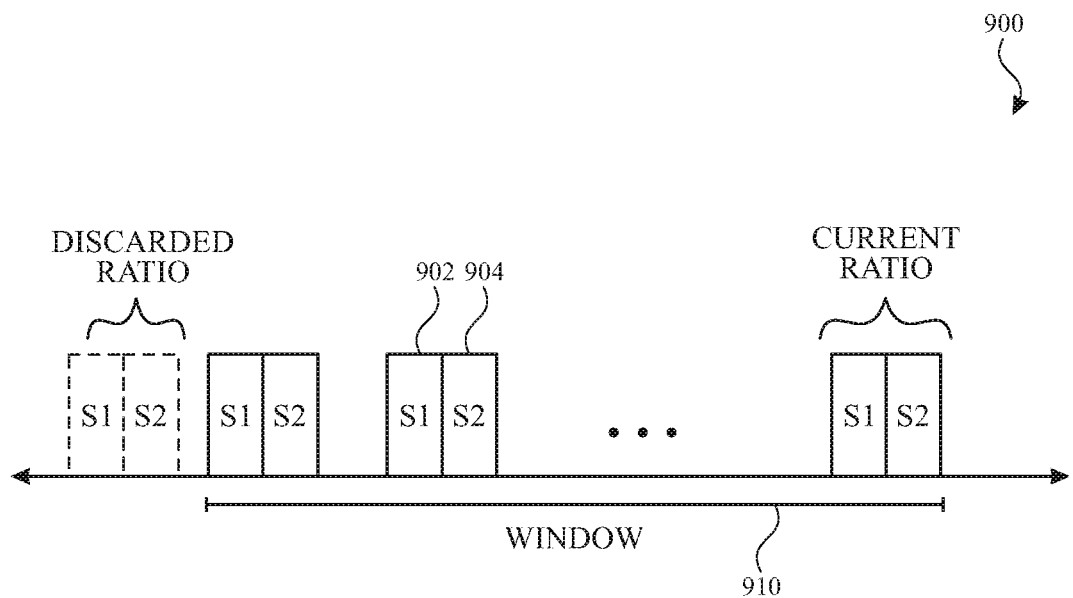
FIG. 9 illustrates an exemplary timeline including a window according to examples of the disclosure.

FIG. 9 illustrates an exemplary timeline 900 including a window 910 according to examples of the disclosure. For example, window 910 can have a width corresponding to a number of ratio measurements. Window 910 can slide along timeline 900 such that a current ratio can be added (e.g., as it is computed), and a ratio in the history can be discarded when the current ratio is added. For example, window 910 can be implemented as a first in first out (FIFO) memory or buffer whose size can accommodate the size of the window. As described above, the window/FIFO can store the ratio and respective ratio threshold for a history of ratio measurements. Additionally or alternatively, the window/FIFO can store the result of the comparison (e.g., indicative of first state or second state) for the history of ratio measurements. As described above, using a history of ratio measurements to infer the state can improve the confidence regarding the determined state and provide hysteresis to avoid high frequency switching between the states. Increasing the size of the window can increase the confidence in the determined state, in some examples. For example, using a window of 5-10 measurements and requiring a threshold number of instances of the ratio meeting the respective ratio threshold can provide improved confidence in the threshold over a single ratio measurement. The size of the window can be selected to balance between the storage/processing requirements and a desired confidence level.

FIG. 10 illustrates an exemplary touch sensitive surface 1000 including an array of touch nodes 1002 according to examples of the disclosure. In some examples, a ratio threshold can be determined for each touch node (e.g., at a design or manufacturing stage). For example, empirical data can be acquired on a per touch node basis for various objects, in various proximity and/or touch conditions, and under various grounding conditions. Based on the empirical data, a ratio threshold can be determined on a per touch node basis for the touch node array. The ratio threshold information can be stored in the device (e.g., in memory) and used for the comparison at 620 to infer a state based on the ratio corresponding to the selected touch node at 615. In examples in which selection of a touch node excludes electrodes proximate to the conductive housing, the ratio thresholds for touch nodes outside of region 1010 need not be determined or stored. In some examples, rather than use a per-touch node ratio threshold, a ratio threshold can be defined for regions of the touch-sensitive surface. In some examples, a first ratio threshold can be applied for touch nodes selected on a first side of boundary line 1020 and a second ratio threshold can be applied for touch nodes selected on second first side of boundary line 1020. In some examples, a first ratio threshold can be applied for touch nodes selected on a first side of boundary line 1030 and a second ratio threshold can be applied for touch nodes selected on second first side of boundary line 1030. In some examples, a different respective ratio threshold can be applied for touch nodes selected from respective quadrants formed by boundary lines 1020 and 1030. In some examples, the regions can be irregular and defined based on the empirical measurements such that groups of touch nodes with closely related ratio thresholds (e.g., within 5%) can be grouped together to form a region using a common ratio threshold. In some examples, the region can be defined as the entire touch-sensitive surface, such that a single ratio threshold can be used for the selected touch node. It should be understood that the number of ratio thresholds can be a tradeoff between the complexity of the system and the precision of the state determination. Using a per-touch node ratio threshold can increase the processing complexity and storage requirements of the system, but can provide more precision for inferring the state. Using a single ratio threshold can reduce the processing complexity and storage requirements of the system, but can provide less precision for inferring the state.

Figure 11A:
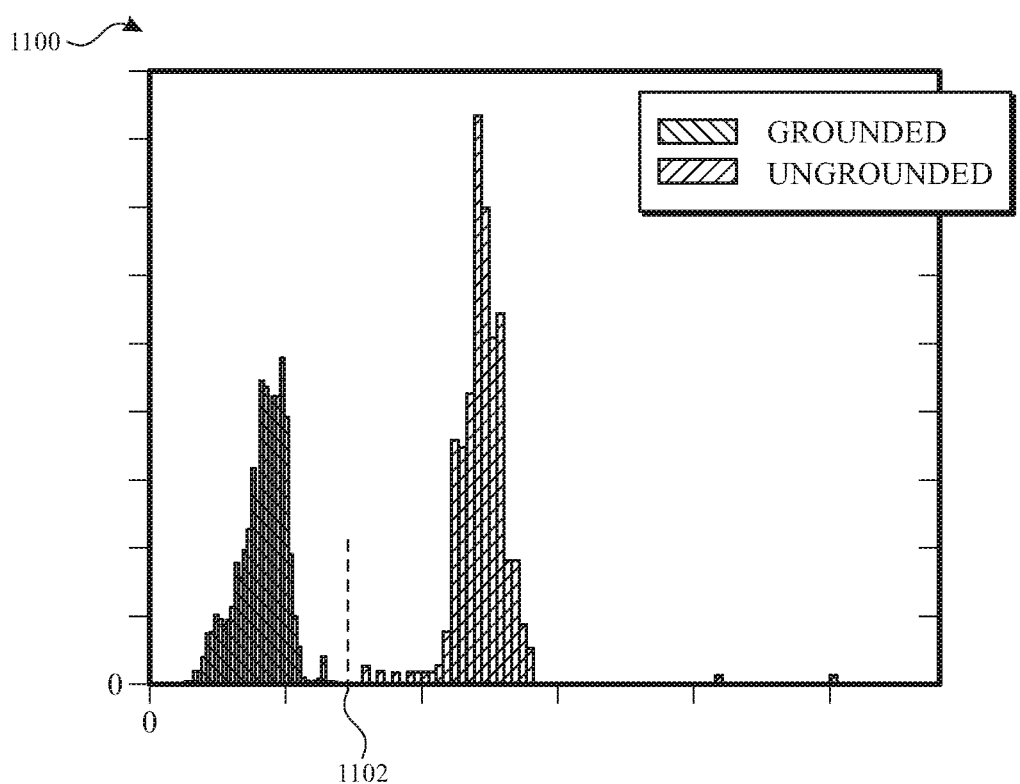
FIGS. 11A-11B illustrate exemplary plots of empirical data used for determining a ratio threshold according to examples of the disclosure.
Figure 11B:
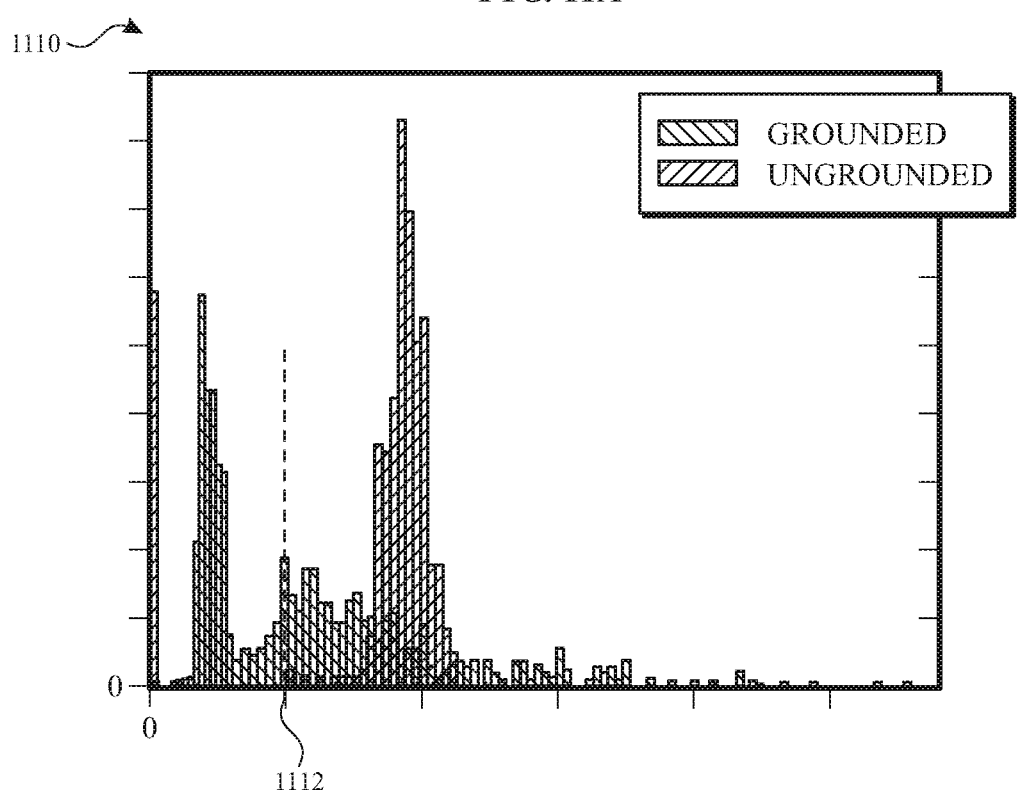

FIGS. 11A-11B illustrate exemplary plots of empirical data used for determining a ratio threshold according to examples of the disclosure. FIG. 11A illustrates plot 1100, a histogram of the calculated maximum ratios corresponding to empirical data for various objects under grounded and ungrounded conditions for a respective touch node. The x-axis can represent the ratio and the y-axis can represent the number of instances of the ratio in the empirical data. In some examples, as illustrated in FIG. 11A, the ratios of the non-guarded scan to the guarded scan for grounded and ungrounded scans can be well separated and a ratio threshold can be set at a ratio between the clusters of ungrounded and grounded data. In some examples, the ratio threshold can be set and the midpoint between the highest ratio for grounded data and the lowest ratio for the ungrounded data, as illustrated by threshold 1102. In some examples, the ratio threshold can be set closer to the cluster of grounded data, such that the system can be biased toward the first state. Biasing the system to the first state can ensure detection of touches when grounding conditions may be unknown or may be borderline between grounded and ungrounded states, but still providing improved rejection of inadvertent touches under well-grounded conditions. Empirical data for other touch nodes can be used to set the respective ratio threshold for the respective other touch nodes.

FIG. 11B illustrates plot 1110, a histogram of the calculated maximum ratios corresponding to empirical data for various objects under grounded and ungrounded conditions. The x-axis can represent the ratio and the y-axis can represent the number of instances of the ratio. In some examples, as illustrated in FIG. 11B, the ratios of the non-guarded scan to the guarded scan for grounded and ungrounded scans can partially overlap. A ratio threshold can be set based on the empirical data. In some examples, the ratio threshold can be set below the minimum ratio recorded in the histogram for ungrounded conditions, as indicated by threshold 1112, such that the system can be biased toward the first state. Biasing the system to the first state can ensure detection of touches when the ratio may correspond to either a grounded or ungrounded state. In some examples, additional margin can be added between the ratio threshold and the ungrounded data cluster to further bias the system toward the first state. Empirical data for other touch nodes can be used to set the respective ratio threshold for the respective other touch nodes.

As described herein, based on determining a respective ratio threshold for respective touch nodes using empirical data, one or more ratio thresholds can be applied for comparison during operation on a per-touch node basis or for a region of touch nodes having a similar ratio threshold (e.g., within a threshold percentage).

Therefore, according to the above, some examples of the disclosure are directed to an electronic device. The electronic device can comprise a touch-sensitive surface and one or more processors coupled to the touch-sensitive surface. The one or more processors can be capable of acquiring a first touch image including first measurements from a plurality of touch nodes of the touch-sensitive surface, acquiring a second touch image including second measurements from the plurality of touch nodes of the touch-sensitive surface, and determining a state from a first state and a second state based on at least one of the first measurements and at least one of the second measurements. In accordance with a determination that the state is the first state, the electronic device can set a first threshold to a first threshold value. In accordance with a determination that the state is the second state, the electronic device can set the first threshold to a second threshold value different than the first threshold value. Additionally or alternatively to one or more of the examples disclosed above, in some examples, the first touch image can be acquired using an unguarded scan and the second touch image can be acquired using a guarded scan. Additionally or alternatively to one or more of the examples disclosed above, in some examples, the one or more processors can be further capable of selecting one of the plurality of touch nodes meeting one or more selection criteria. Additionally or alternatively to one or more of the examples disclosed above, in some examples, the one or more selection criteria can include a criterion that a signal measurement of the selected one of the plurality of touch nodes corresponds to a maximum signal threshold for the plurality of touch nodes. Additionally or alternatively to one or more of the examples disclosed above, in some examples, the one or more selection criteria can include a criterion that the selected one of the plurality of touch nodes is a threshold distance away from a closest edge of the touch-sensitive surface. Additionally or alternatively to one or more of the examples disclosed above, in some examples, the one or more processors can be capable of computing a ratio of one of the first measurements and one of the second measurements corresponding to the selected one of the plurality of touch nodes. Additionally or alternatively to one or more of the examples disclosed above, in some examples, determining the state can comprise determining the state to be the second state in accordance with the ratio corresponding to the selected one of the plurality of touch nodes meeting a ratio threshold. Additionally or alternatively to one or more of the examples disclosed above, in some examples, determining the state can comprise determining the state to be the first state in accordance with the ratio corresponding to the selected one of the plurality of touch nodes failing to meet the ratio threshold. Additionally or alternatively to one or more of the examples disclosed above, in some examples, the ratio threshold can be selected corresponding to the selected one of the plurality of touch nodes. Additionally or alternatively to one or more of the examples disclosed above, in some examples, the ratio threshold can be selected corresponding to a region of the touch-sensitive surface in which the selected one of the plurality of touch nodes is located. Additionally or alternatively to one or more of the examples disclosed above, in some examples, determining the state can comprise determining the state to be the second state in accordance with a threshold number of ratios, including the ratio corresponding to the selected one of the plurality of touch nodes and including a history of one or more previous ratios, meeting one or more respective ratio thresholds. Additionally or alternatively to one or more of the examples disclosed above, in some examples, determining the state can comprise determining the state to be the first state in accordance with fewer than the threshold number of ratios, including the ratio corresponding to the selected one of the plurality of touch nodes and the history of one or more previous ratios, meeting the one or more respective ratio thresholds. Additionally or alternatively to one or more of the examples disclosed above, in some examples, the history of one or more previous ratios can include at least one ratio corresponding to a different one of the plurality of touch nodes than the selected one of the plurality of touch nodes. The at least one ratio corresponding to the different one of the plurality of touch nodes can be compared with a first respective ratio threshold different than that the second respective ratio threshold to which the selected one of the plurality of touch nodes can be compared. Additionally or alternatively to one or more of the examples disclosed above, in some examples, the first threshold can be a signal density threshold. Additionally or alternatively to one or more of the examples disclosed above, in some examples, the one or more processors can be capable of determining a contact between a conductive housing of the electronic device and a user. The state can be further determined based on the determination of the contact between the conductive housing of the electronic device and the user. Additionally or alternatively to one or more of the examples disclosed above, in some examples, the electronic device can be a wearable electronic device.

Some examples of the disclosure are directed to a method. The method can comprise acquiring a first touch image including first measurements from a plurality of touch nodes of a touch-sensitive surface, acquiring a second touch image including second measurements from the plurality of touch nodes of the touch-sensitive surface, and determining a state from a first state and a second state based on at least one of the first measurements and at least one of the second measurements. The method can further comprise: in accordance with a determination that the state is the first state, setting a first threshold to a first threshold value; and in accordance with a determination that the state is the second state, setting the first threshold to a second threshold value different than the first threshold value. Additionally or alternatively to one or more of the examples disclosed above, in some examples, the first touch image can be acquired using an unguarded scan and the second touch image can be acquired using a guarded scan. Additionally or alternatively to one or more of the examples disclosed above, in some examples, the method can further comprise selecting one of the plurality of touch nodes meeting one or more selection criteria. Additionally or alternatively to one or more of the examples disclosed above, in some examples, the one or more selection criteria can include a criterion that a signal measurement of the selected one of the plurality of touch nodes corresponds to a maximum signal threshold for the plurality of touch nodes. Additionally or alternatively to one or more of the examples disclosed above, in some examples, the one or more selection criteria can include a criterion that the selected one of the plurality of touch nodes is a threshold distance away from a closest edge of the touch-sensitive surface. Additionally or alternatively to one or more of the examples disclosed above, in some examples, the method can comprise computing a ratio of one of the first measurements and one of the second measurements corresponding to the selected one of the plurality of touch nodes. Additionally or alternatively to one or more of the examples disclosed above, in some examples, determining the state can comprise determining the state to be the second state in accordance with the ratio corresponding to the selected one of the plurality of touch nodes meeting a ratio threshold. Additionally or alternatively to one or more of the examples disclosed above, in some examples, determining the state can comprise determining the state to be the first state in accordance with the ratio corresponding to the selected one of the plurality of touch nodes failing to meet the ratio threshold. Additionally or alternatively to one or more of the examples disclosed above, in some examples, the ratio threshold can be selected corresponding to the selected one of the plurality of touch nodes. Additionally or alternatively to one or more of the examples disclosed above, in some examples, the ratio threshold can be selected corresponding to a region of the touch-sensitive surface in which the selected one of the plurality of touch nodes is located. Additionally or alternatively to one or more of the examples disclosed above, in some examples, determining the state can comprise determining the state to be the second state in accordance with a threshold number of ratios, including the ratio corresponding to the selected one of the plurality of touch nodes and including a history of one or more previous ratios, meeting one or more respective ratio thresholds. Additionally or alternatively to one or more of the examples disclosed above, in some examples, determining the state can comprise determining the state to be the first state in accordance with fewer than the threshold number of ratios, including the ratio corresponding to the selected one of the plurality of touch nodes and the history of one or more previous ratios, meeting the one or more respective ratio thresholds. Additionally or alternatively to one or more of the examples disclosed above, in some examples, the history of one or more previous ratios can include at least one ratio corresponding to a different one of the plurality of touch nodes than the selected one of the plurality of touch nodes. The at least one ratio corresponding to the different one of the plurality of touch nodes can be compared with a first respective ratio threshold different than that the second respective ratio threshold to which the selected one of the plurality of touch nodes can be compared. Additionally or alternatively to one or more of the examples disclosed above, in some examples, the first threshold can be a signal density threshold. Additionally or alternatively to one or more of the examples disclosed above, in some examples, the method can further comprise determining a contact between a conductive housing of the electronic device and a user. The state can be further determined based on the determination of the contact between the conductive housing of the electronic device and the user. Additionally or alternatively to one or more of the examples disclosed above, in some examples, the method can be performed in a wearable electronic device. Some examples of the disclosure are directed to a non-transitory computer readable storage medium. A non-transitory computer readable storage medium can store instructions, which when executed by one or more processors, cause the one or more processors to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
   a touch-sensitive surface; and
   one or more processors coupled to the touch-sensitive surface configured to:
   acquire a first touch image including first measurements from a plurality of touch nodes of the touch-sensitive surface;
   acquire a second touch image including second measurements from the plurality of touch nodes of the touch-sensitive surface;
   determine a state from a first state and a second state based on at least one of the first measurements and at least one of the second measurements;
   in accordance with a determination that the state is the first state, set a first threshold to a first threshold value;
   in accordance with a determination that the state is the second state, set the first threshold to a second threshold value different than the first threshold value; and
   determine whether an input patch corresponds to a touch input patch or the non-touch input patch using the first threshold.

2. The electronic device of claim 1, wherein the first touch image is acquired using an unguarded scan and the second touch image is acquired using an guarded scan.

3. The electronic device of claim 1, wherein the one or more processors are further configured to:
   select one of the plurality of touch nodes meeting one or more selection criteria.

4. The electronic device of claim 3, wherein the one or more selection criteria includes a criterion that a signal measurement of the selected one of the plurality of touch nodes corresponds to a maximum signal threshold for the plurality of touch nodes.

5. The electronic device of claim 3, wherein the one or more selection criteria includes a criterion that the selected one of the plurality of touch nodes is a threshold distance away from a closest edge of the touch-sensitive surface.

6. The electronic device of claim 3, wherein the one or more processors are further configured to:
   compute a ratio of one of the first measurements and one of the second measurements corresponding to the selected one of the plurality of touch nodes.

7. The electronic device of claim 6, wherein determining the state comprises:
   in accordance with the ratio corresponding to the selected one of the plurality of touch nodes meeting a ratio threshold, determining the state to be the second state; and
   in accordance with the ratio corresponding to the selected one of the plurality of touch nodes failing to meet the ratio threshold, determining the state to be the first state.

8. The electronic device of claim 7, wherein the ratio threshold is selected corresponding to the selected one of the plurality of touch nodes.

9. The electronic device of claim 7, wherein the ratio threshold is selected corresponding to a region of the touch-sensitive surface in which the selected one of the plurality of touch nodes is located.

10. The electronic device of claim 6, wherein determining the state comprises:
    in accordance with a threshold number of ratios, including the ratio corresponding to the selected one of the plurality of touch nodes and including a history of one or more previous ratios, meeting one or more respective ratio thresholds, determining the state to be the second state; and
    in accordance with fewer than the threshold number of ratios, including the ratio corresponding to the selected one of the plurality of touch nodes and the history of one or more previous ratios, meeting the one or more respective ratio thresholds, determining the state to be the first state.

11. The electronic device of claim 10, wherein the history of one or more previous ratios includes at least one ratio corresponding to a different one of the plurality of touch nodes than the selected one of the plurality of touch nodes, and wherein the at least one ratio corresponding to the different one of the plurality of touch nodes is compared with a first respective ratio threshold different than that the second respective ratio threshold to which the selected one of the plurality of touch nodes is compared.

12. The electronic device of claim 1, wherein the first threshold is a signal density threshold.

13. The electronic device of claim 1, the one or more processors further configured to determine a contact between a conductive housing of the electronic device and a user, wherein the state is further determined based on the determination of the contact between the conductive housing of the electronic device and the user.

14. The electronic device of claim 1, wherein the electronic device is a wearable electronic device.

15. A method comprising:
acquiring a first touch image including first measurements from a plurality of touch nodes of a touch-sensitive surface;
acquiring a second touch image including second measurements from the plurality of touch nodes of the touch-sensitive surface;
determining a state from a first state and a second state based on at least one of the first measurements and at least one of the second measurements;
in accordance with a determination that the state is the first state, setting a first threshold to a first threshold value;
in accordance with a determination that the state is the second state, setting the first threshold to a second threshold value different than the first threshold value; and
determining whether an input patch corresponds to a touch input patch or the non-touch input patch using the first threshold.

16. The method of claim 15, wherein the first touch image is acquired using an unguarded scan and the second touch image is acquired using a guarded scan.

17. The method of claim 15, further comprising:
selecting one of the plurality of touch nodes meeting one or more selection criteria.

18. The method of claim 17, further comprising:
computing a ratio of one of the first measurements and one of the second measurements corresponding to the selected one of the plurality of touch nodes.

19. The method of claim 18, wherein determining the state comprises:
in accordance with the ratio corresponding to the selected one of the plurality of touch nodes meeting a ratio threshold, determining the state to be the second state; and
in accordance with the ratio corresponding to the selected one of the plurality of touch nodes failing to meet the ratio threshold, determining the state to be the first state.

20. A non-transitory computer readable storage medium storing instructions, which when executed by one or more processors, cause the one or more processors to perform a method, the method comprising:
acquiring a first touch image including first measurements from a plurality of touch nodes of a touch-sensitive surface;
acquiring a second touch image including second measurements from the plurality of touch nodes of the touch-sensitive surface;
determining a state from a first state and a second state based on at least one of the first measurements and at least one of the second measurements;
in accordance with a determination that the state is the first state, setting a first threshold to a first threshold value;
in accordance with a determination that the state is the second state, setting the first threshold to a second threshold value different than the first threshold value; and
determining whether an input patch corresponds to a touch input patch or the non-touch input patch using the first threshold.

21. The non-transitory computer readable storage medium of claim 20, wherein the first touch image is acquired using an unguarded scan and the second touch image is acquired using a guarded scan.

22. The non-transitory computer readable storage medium of claim 20, the method further comprising:
selecting one of the plurality of touch nodes meeting one or more selection criteria.

23. The non-transitory computer readable storage medium of claim 22, the method further comprising:
computing a ratio of one of the first measurements and one of the second measurements corresponding to the selected one of the plurality of touch nodes.

24. The non-transitory computer readable storage medium of claim 23, wherein determining the state comprises:
in accordance with the ratio corresponding to the selected one of the plurality of touch nodes meeting a ratio threshold, determining the state to be the second state; and
in accordance with the ratio corresponding to the selected one of the plurality of touch nodes failing to meet the ratio threshold, determining the state to be the first state.

25. The non-transitory computer readable storage medium of claim 23, wherein determining the state comprises:
in accordance with a threshold number of ratios, including the ratio corresponding to the selected one of the plurality of touch nodes and including a history of one or more previous ratios, meeting one or more respective ratio thresholds, determining the state to be the second state; and
in accordance with fewer than the threshold number of ratios, including the ratio corresponding to the selected one of the plurality of touch nodes and the history of one or more previous ratios, meeting the one or more respective ratio thresholds, determining the state to be the first state.

* * * * *